United States Patent [19]
Andersen et al.

[11] 4,289,375
[45] Sep. 15, 1981

[54] OPTICAL ELEMENT FOR INCORPORATION INTO OPTICAL TRANSMISSION MEANS

[75] Inventors: Axel Andersen, Gentofte; Poul U. Knudsen, Hellerup; Knud B. Jensen, Skodsborg, all of Denmark

[73] Assignee: Aktieselskabet Nordiske Kabel-og Traadfabriker, Copenhagen, Denmark

[21] Appl. No.: 848,695

[22] Filed: Nov. 4, 1977

[30] Foreign Application Priority Data

Nov. 9, 1976 [DK] Denmark .......................... 5052/76

[51] Int. Cl.³ ................................................ G02B 5/16
[52] U.S. Cl. ................................ 350/96.23; 350/96.30
[58] Field of Search ............... 350/96.23, 96.29, 96.30, 350/96.33

[56] References Cited

U.S. PATENT DOCUMENTS

| | | | |
|---|---|---|---|
| 3,883,218 | 5/1975 | Slaughter | 350/96.23 |
| 3,937,559 | 2/1976 | Ferrentino et al. | 350/96.23 |
| 3,980,390 | 9/1976 | Yamamoto et al. | 350/96.33 |
| 4,009,932 | 3/1977 | Ferrentino | 350/96.23 |
| 4,113,349 | 9/1978 | Stiles | 350/96.23 |
| 4,113,350 | 9/1978 | Haines | 350/96.29 |
| 4,114,981 | 9/1978 | Ishida et al. | 350/96.33 |
| 4,147,407 | 4/1979 | Eichenbaum et al. | 350/96.23 X |

FOREIGN PATENT DOCUMENTS

| | | | |
|---|---|---|---|
| 80107 | 4/1975 | Australia . | |
| 2519050 | 11/1976 | Fed. Rep. of Germany | 350/96.23 |
| 2233637 | 1/1975 | France | 350/96.33 |
| 1476903 | 6/1977 | United Kingdom . | |
| 1487464 | 9/1977 | United Kingdom . | |

OTHER PUBLICATIONS

Foord et al., "Principles of Fibre-Optical Cable Design," *Proc. of IEE*, vol. 123, No. 6, Jun. 1976, pp. 597-602.

*Primary Examiner*—John K. Corbin
*Assistant Examiner*—John D. Lee
*Attorney, Agent, or Firm*—Ladas & Parry

[57] ABSTRACT

An optical element for incorporation into optical transmission means and comprising an optical fiber provided with a coating with a substantially circular cross section applied essentially coaxially closely around the fiber, to which coating is imparted such an adhesion to the optical fiber that a contraction tendency in the coating brought about in connection with the application of the coating affects the fiber with such an axial compressive force in its whole length that the force causes a real shortening of the fiber and a corresponding increase of the elongation at break of the fiber. The fiber can be provided with an intermediate protective layer, and an intermediate adhesive layer can be used. Optical transmission means comprising one or more optical elements in a sheath are described.

11 Claims, 4 Drawing Figures

OPTICAL ELEMENT FOR INCORPORATION INTO OPTICAL TRANSMISSION MEANS

BACKGROUND OF THE INVENTION

1. Field of the Invention

The present invention relates to an optical element for incorporation into optical transmission means such as tele-cables, which element is of the type comprising an optical fiber of glass or resin possibly provided with a thin protective layer applied closely around the fiber as well as a coating with a substantially circular cross section applied essentially coaxially closely around the fiber. The invention further relates to a transmission means comprising such optical elements.

2. Description of the Prior Art

It is known to prepare tele-cables with optical fibers where the fibers are placed freely movable in the cables in longitudinal spaces with cross-sectional dimensions considerably bigger than the fiber diameter, cf. for example the Swedish patent application No. 75,08599-3 corresponding to DT-OS No. 25 28 991 and DT-OS No. 25 05 621 where a fiber is placed freely movable in a first jacket which further is placed freely movable in a second jacket.

It is also known to establish a twisted placing of the fibers in such spaces. Furthermore, it is known to adhere fibers in undulated paths between two plastic bands which then are wound around a massive support wire, cf. U.S. Pat. No. 3,937,559 (DT-OS No. 24 24 041). Moreover, cables are also known where the fibers are wound helically around a soft support layer placed around a central reinforcing member, cf. U.S. Pat. No. 3,883,218 (DT-OS No. 23 55 854).

DT-OS No. 25 19 050 describes an optical cable with prestressed strength members which are shaped so as to form compartments in which optical fibers are placed without tension, and after relief of the member a fiber overlength is obtained resulting in an improved elongation at break.

DT-OS No. 24 19 798 describes optical fibers of the type where the fiber itself consists of a core with a high refractive index and a jacket with a lower refractive index, and these fibers are characteristic in that the sheath is surrounded by at least one additional sheath whose heat extension coefficient is lower than the extension coefficient for the internal sheath or the combination of core and sheath According to prior art a compressive stress can with advantage be produced in the sheath in the preparation of such fibers. However, the "sheath" in question constitutes an integral part of the fiber, and is thus not a coating. In respect of massive fibers a sheath of material is applied on the mentioned first sheath, the heat extension coefficient of which material is lower than the subjacent layer or layers. This outer sheath will thus be exposed to compressive stress and the subjacent layer therefore to tensile stress.

In respect of the special type of fibers which have a fluid core surrounded by a massive sheath being in itself free from tension, the sheath is, according to the publication, surrounded by a further sheath having a higher heat extension coefficient which therefore is exposed to tensile stress, and the first sheath is exposed to compressive stress. However, such coated fibers are said to be very sensitive to tensile and bending forces for which reason they must according to the publication be provided with a further sheath whose heat extension coefficient is lower than that of the other sheath. Consequently, the first and third sheath are exposed to compressive stress while the second sheath is exposed to tensile stress.

In other words, the aim according to the publication is to expose the outer sheath to a constant compressive stress as this is said to give the best mechanical strength.

From the U.S. Pat. No. 3,980,390 it is known to improve the mechanical properties of the fiber such as tensile strength at break, elongation at break and minimum bending diameter by applying a two-layer polymer coating.

It is a common aim of these known cable types to prevent as far as possible the mechanical impacts at tension or bending from affecting the optical fibers and especially prevent detrimental tensile impacts.

The object of the present invention is to provide constructional characteristics whereby it is possible to a higher degree than heretofore to avoid deterioration or destruction of the optical fibers with respect to their transmission capability as a consequence of mechanical impacts such as tension, bending, torsion and vibration. In this connection it must be remembered that deterioration or even destruction of the transmission capability of an otherwise perfect fiber can be expected, if due to one or more defects its light conducting interior is narrowed or bent even at an extremely small part of a cable section where the magnitude of the extent of the defect is only a fraction of a millimeter for which reason such defects are referred to as microcracks or microbendings. It is obvious that a tensile force affecting the optical fiber will increase the possibility of cracks the bigger the tensile force is. In the heretofore known constructions of tele-cables with optical fibers efforts have been made, as previously stated, to reduce the size and risk of tensile stresses in the optical fibers.

DESCRIPTION OF THE ACCOMPANYING DRAWINGS

DESCRIPTION OF THE INVENTION

Figure 1:
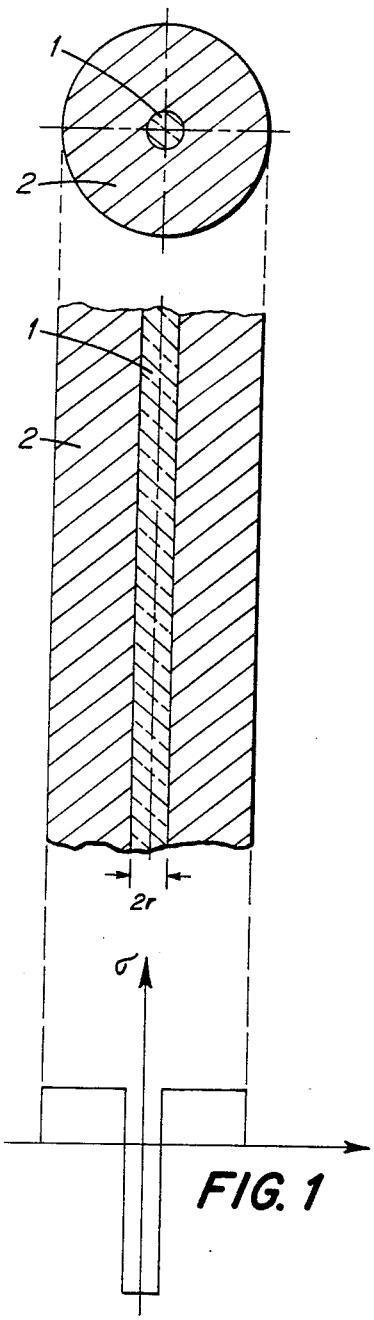
FIG. 1 shows a cross section of a part of an element according to the invention as well as the appurtenant longitudinal section and tensile stress distribution in the cross section of the element.

The present invention departs from the conventional principle as it has surprisingly been found that improvements in several respects can be achieved by establishing a not insignificant compressive force in each fiber by providing it with a tight-fitting and suitably thick coating which is given a predetermined contraction tendency.

The subject element is therefore characteristic in that the coating is given such an adhesion to the optical fiber possibly provided with a protective layer that a contraction tendency in the coating brought about in connection with—in practice during and/or after—the application affects the fiber with such an axial compressive force in its whole length that the compressive force causes a real shortening of the fiber and a corresponding increase of the elongation at break. By the expression "real shortening" is understood a measureable shortening exceeding the insignificant shortening which may be expected, but is not at all mentioned, when applying adhesive layers as described in the above U.S. Pat. No. 3,980,390 and similar coatings.

According to the invention the shortening, as will be described in greater detail below, amounts to preferably at least 0.5% of the original length of the fiber when otherwise the element is not affected by external forces. The compressive stress thus established in the optical fiber should as far as possible constitute a not insignificant amount, for example numerically at least one tenth of the tensile stress at break of the fiber.

In relation to the above DT-OS No. 24 19 798 the process of the invention is the exact opposite as a coating is applied which affects the optical fiber itself for compressive stress for which reason the coating conversely is exposed to tensile stress, see below.

The coating used can for example consist of a natural or synthetic polymer material such as polyethylene, polypropylene or copolymers thereof, polyvinyl chloride or polyamide such as polyamide 11 or 12 where the latter group of material would seem particularly appropriate due to its strong adhesion to other materials. However, this enumeration should not be construed as limiting, since the invention is not primarily based on the choice of specific materials, and other polymers or copolymers may also be used.

If desired, the coating can further comprise an additive for example a reinforcement material such as essentially longitudinal fibers. At prestressing and subsequent relief of such fibers they will be able to contribute to the contraction tendency of the coating. Other suitable additives are for example organic or inorganic fillers, arbitrarily oriented fibers, cross-linkers, pigments, dyes, etc.

As it is of great importance that there is a sufficiently strong adhesion between the fiber and the coating, it can, if the coating material in itself is not expected to show the necessary adhesion, be advantageous according to the invention to apply an adhesive intermediate layer showing adhesion to both the optical fiber and to the surrounding coating. In this way polymer materials showing a modest adhesion per se may also be applicable as coating materials.

It is surprising that fibers can be achieved having a fully satisfactory optical capability when these are affected by the mentioned compressive forces. In the heretofore known cable types efforts have therefore been made to avoid as far as possible the establishment of such forces, for example by applying the coating so that a clearance is obtained between the fiber and the coating and/or by applying lubricants, such as silicone oil which makes a mutual sliding possible and prevents a partial adhesion of the coating to the fiber.

When one or more of the subject elements are placed in a sheath to form for example a tele-cable the fibers can in a manner known per se be placed in straight or twisted shapes.

It will be seen that the finished cable comprising such elements withstands tensile impacts to an exceptionally high degree. The tensile impacts on the cable can arise during handling or laying out and cause the cable to be elongated. At an increasing elongation the following will happen:

(a) Firstly, the above twisted shapes are straightened, (b) then the elements are elongated until the compressive force is essentially zero in the optical fibers, (c) then the optical fibers are elongated, and (d) only then, breaks occur in the optical fibers.

It will be understood that at a suitable selection of materials the elements will get an elongation at break considerably bigger than the elongation at break of the optical fiber as the shortening mentioned above is added hereto.

Usually, it is necessary to provide the cable with strength members serving the function of absorbing the previously mentioned tensile impacts without detrimental deteriorations of the transmission elements of the cable.

It will be seen that such strength members, if any, can be constructed from relatively simpler and cheaper materials than possible heretofore due to the substantially increased elongation at break achieved according to the invention.

In one more respect an improvement is achieved over and above the known elements where the optical fibers are supported or fixed, as in the subject elements there is a diminished risk of the formation of microbendings which normally occur where the fiber is exposed to heavily localized forces, as the fiber in the element is only affected by forces being evenly distributed along the whole fiber. Furthermore, existing microcracks are suppressed as well as the tendency to form such.

The invention is illustrated in greater detail on the drawing where an example of an element according to the invention is shown in FIG. 1. The optical fiber (1) coated with a protective layer which is not shown, is surrounded by a coating (2) of a material having a suitable adhesion to the coated fiber. At the bottom of the figure the tensile stress distribution in the cross section of the element is shown. The fiber is exposed to compressive stress and the coating to tensile stress. The improvement achieved by the produced compressive stress in the fiber lies in the fact that the element itself, and also a cable containing this, can withstand an increased elongation and more vigorous bending as a consequence of this. If the relative shortening of the fiber resulting from the compressive stress is $\epsilon$ the fiber can be exposed to a bending radius $R = r/\epsilon$, where r is the radius of the fiber without the occurrence of a tensile stress anywhere in the fiber cross section.

Optical fibers can normally be exposed to a bending radius of an order as low as about 10 cm without causing a noticably increased loss of transmission. Accordingly, for a fiber with a radius $r = 0.05$ mm a relative shortening $\epsilon = r/R$ of at least 0.5% will be required to maintain the compressive stress.

The fiber can for example be subjected to the desired compressive force by giving the coating, for example by a special heat treatment process, a contraction tendency after the application of the coating. The coating can for example be extruded around the fiber so that it is given a sufficiently stronger adhesion to this without any sliding between the fiber and the coating.

The treatment resulting in a shortening of the coating can for example consist in a suitably slow cooling in connection with the extrusion which ensures that the adhesion to the fiber is maintained during the thermically conditioned contraction of the plastic material. An increased shortening can in certain cases be achieved by giving a polymer coating material a high degree of molecule orientation at the extrusion; the shortening is achieved by then giving the molecules a more random orientation. This can, as is illustrated below in connection with FIG. 4, for example be achieved by the heat treatment previously mentioned.

The size of the relative shortening $\epsilon$ of the fibers is given by the expression $$\epsilon = \epsilon' \cdot \frac{E_2 A_2}{E_1 A_1 + E_2 A_2}$$

Figure 2:
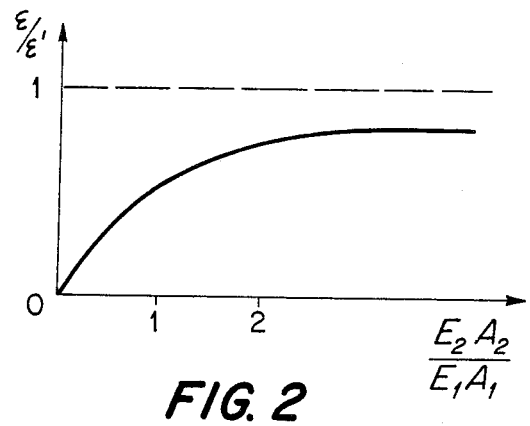
FIG. 2 shows the compression of the fiber in the longitudinal direction as a function of the elasticity modulus and cross sectional areas of the two materials.

Here $\epsilon'$ is the difference in relative shortening of the coating and the fiber at the contracting finishing treatment, in an imaginary case where the two components cannot affect each other during the finishing treatment. Besides $E_1$ is: Young's modulus for the fiber
$E_2$ is: Young's modulus for the coating material
$A_1$ is: The cross sectional area of the fiber
$A_2$ is: The cross sectional area of the coating FIG. 2 shows how $\epsilon$ depends on the ratio of $E_2 A_2$ to $E_1 A_1$. It will be seen that for suitably big values of $E_2$ and $A_2$ a relative shortening $\epsilon$ of the fiber can be achieved approaching the difference $\epsilon'$ between the relative shortening in a free state of the coating and the fiber.

Figure 3:
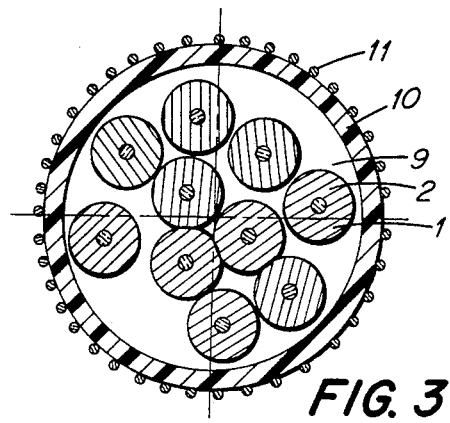
FIG. 3 shows a cross section of a tele-cable with optical elements of the type shown in FIG. 1.

The subject element is as mentioned applicable in transmission means such as tele-cables. An example of this is shown in FIG. 3. Here an optical element (1, 2) is placed in a space (9) under a plastic sheath (10) which in a manner known per se is externally provided with strength wires (11).

Figure 4:
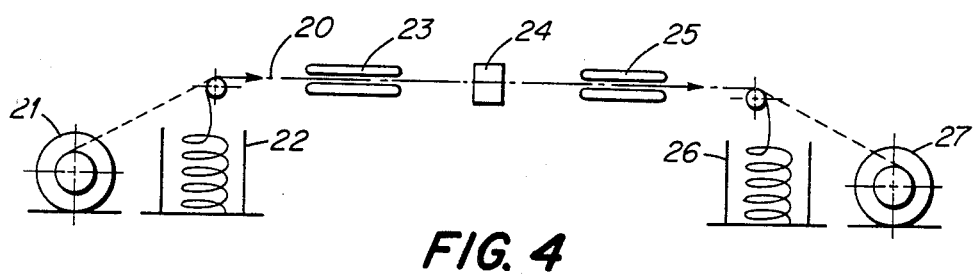
FIG. 4 shows an example of an arrangement for treating an optical element so that the necessary contraction tendency is achieved.

FIG. 4 shows an example of an arrangement for treating an optical element so as to achieve the compressive force on the fiber characteristic of the invention. The process is as follows: the element (20), which at this moment shows no substantial contraction tendency, is present on the coil (21) or in the container (22) and is drawn forward by the drawing (23) and is directed through the assembly (24) where the element (20) is heat treated. Then the element (20) passes another drawing means (25) connected to the means (23) so that the treatment of the element (20 in the assembly (24) takes place without tensile impact. The finished element (20), which then shows the desired contraction tendency, is finally collected in the container (26) or on the coil (27).

What we claim is:

1. An optical element for incorporation into optical transmission means which comprises an optical fiber provided with a coating with a substantially circular cross section applied essentially coaxially closely around the fiber, to which coating is imparted such an adhesion to the optical fiber that a contraction tendency in the coating brought about in connection with the application of the coating affects the fiber with such an axial compressive force in its whole length that the force causes a real shortening of the fiber and a corresponding increase of the elongation at break of the fiber, said shortening amounting to at least 0.5% of the original length of the fiber when otherwise the element is not affected by external forces.

2. An optical element according to claim 1, wherein the optical fiber is provided with an intermediate protective layer.

3. An optical element according to claim 1, wherein the compressive stress in the fiber, which is caused by the contraction, is numerically at least one tenth of the tensile stress at break of the fiber.

4. An optical element according to claim 1, wherein the coating comprises a polymer material.

5. An optical element according to claim 4, wherein the polymer material is chosen from the group consisting of a polyethylene, polypropylene, ethylenepropylene copolymer, polyvinyl chloride and polyamide.

6. An optical element according to claim 4, wherein the coating furthermore comprises a reinforcement material contributing to the desired contraction tendency.

7. An optical element according to claim 1, wherein the adhesion is brought about or supported by an intermediate layer showing adhesion to both the optical fiber and to the surrounding coating.

8. An optical element according to claim 1, wherein the contraction tendency in the coating is brought about by an extrusion followed by a slow cooling.

9. An optical element according to claim 1, wherein the contraction tendency in the coating is brought about by an extrusion under conditions causing a high degree of molecule orientation followed by a treatment causing a more random molecule orientation.

10. An optical element according to claim 9, wherein said treatment causing a more random molecule orientation is a heat treatment.

11. Optical transmission means comprising at least one optical element located in a sheath wherein said optical element consists of an optical fiber provided with a coating with a substantially circular cross section applied essentially coaxially closely around the fiber, to which coating is imparted such an adhesion to the optical fiber that a contraction tendency in the coating brought about in connection with the application of the coating affects the fiber with such an axial compressive force in its whole length that the force causes a real shortening of the fiber and a corresponding increase of the elongation at the break of the fiber, said shortening amounting to at least 0.5% of the original length of the fiber when otherwise the element is not affected by external forces.

* * * * *